Nov. 8, 1960 G. F. W. POWELL 2,959,679
RADIATION GAUGES HAVING IONIZATION CHAMBERS
Filed May 15, 1957 4 Sheets-Sheet 2

INVENTOR
Gordon F. W. Powell
BY
Watson, Cole, Grindle & Watson
ATTORNEYS

Nov. 8, 1960 G. F. W. POWELL 2,959,679
RADIATION GAUGES HAVING IONIZATION CHAMBERS
Filed May 15, 1957 4 Sheets-Sheet 4

Inventor

Gordon F. W. Powell
By Watson, Cole, Grindle + Watson
Attorneys

United States Patent Office 2,959,679
Patented Nov. 8, 1960

2,959,679

RADIATION GAUGES HAVING IONIZATION CHAMBERS

Gordon Francis Wellington Powell, Deptford, London, England, assignor to Molins Machine Company Limited, London, England, a British company Filed May 15, 1957, Ser. No. 659,325

Claims priority, application Great Britain May 15, 1956

5 Claims. (Cl. 250—83.6)

This invention concerns improvements in radiation gauges having ionization chambers. These gauges are used for measuring thickness and the chamber described later can be used in connection with any radiation gauge, but it is particularly suitable for use in the measurement of moving fillers of tobacco which are formed on cigarette making and like machines.

As will be seen later, the chamber of the present invention is particularly useful for measuring the mass of a loose tobacco filler and this is advantageous because the measurement can take place at an earlier stage in the manufacture of the cigarettes than when a wrapped rod is measured and consequently correction of the tobacco feeding arrangements can be made more nearly to the time when deviation in the mass occurs.

In ionization chambers as hitherto constructed, the sensitivity can be adjusted by altering the gas pressure in the chamber, but this is naturally a fairly coarse method of adjustment and is not easy to do.

According to the invention there is provided a radiation gauge for measuring a moving tobacco filler having an ionization chamber (e.g. of cylindrical shape) with a window and containing plate-like electrodes so disposed that they lie in planes transverse to the plane of the window, and comprising means for moving (e.g. rotating) the chamber whereby the electrode plates may be disposed in different angular relationships to the radioactive source of the gauge presenting in combination with the tobacco filler which is interposed between the source and chamber differing areas or "apertures" of chamber to the rays emitted from the source. For example the planes of the electrodes may be more or less normal to the plane of the window and cross-sections thereof parallel to the window may be parallel to one another.

The gas in the chamber which may, for example, be nitrogen, or a mixture of argon and carbon dioxide, is passed into the chamber through a metal tube permanently fixed to the chamber and when filling to the desired pressure is obtained the inlet tube is sealed so that the chamber remains permanently filled with a gas or a mixture of gases at a desired pressure.

The invention will be further described with reference to the accompanying drawings, in which.

Figure 1:
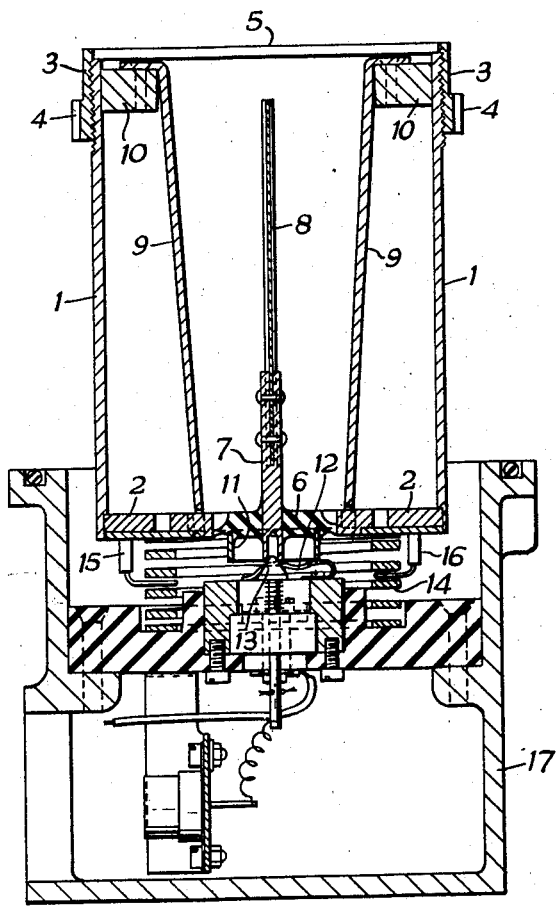
Figure 1 is a section of an ionization chamber and its mounting.
Figure 2:
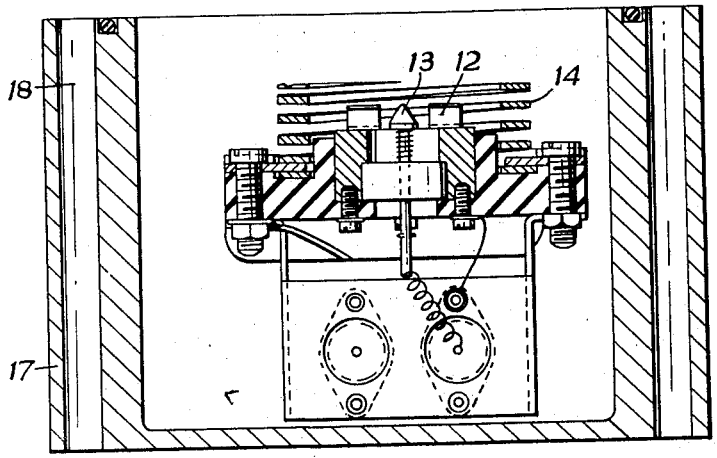
Figure 2 is a transverse section of the lower part of Figure 1.

Referring to Figure 1, the chamber consists of a cylindrical metal casing 1, the bottom of which is enclosed by a disc 2, which is connected to the casing wall by soldering or welding so as to make a gas-tight seal. The upper end of the casing is closed by a threaded ring 3 having gear teeth 4 on its exterior and the top of the ring has plated thereon a nickel diaphragm 5 which constitutes the window of the chamber. After the parts have been assembled solder is applied between the lower part of the ring 3 and the casing 1 so that the chamber is completely sealed, the middle of the disc 2 comprising a glass-to-metal seal at 6. At the middle of the glass portion 6 is a rod-shaped electrode 7 to which is attached one plate 8 of the ionization chamber, the plate being formed of thin sheet metal corrugated lengthwise to increase its stiffness. At each side of the plate 8 are further plates 9 which are joined to a flange 10 on the interior of the casing 1 and are thus in metallic connection therewith. The plates may converge towards one another as shown in Figure 1 as the field strength declines at places more remote from the radio-active source. Beneath the glass 6 and surrounding the central electrode is a metal ring 11 which constitutes the guard ring of the chamber and to which contact is made by a bifurcated spring contact 12. Between the arms of this contact there is arranged a spring pressed stud 13 which forms the connection to the central plate electrode 8. The chamber is supported on a large helical spring 14 which contacts with the base of the chamber and forms a connection thereto. The chamber may be rotated about its longitudinal axis by means of the gear 4 which is engaged by a pinion in the same way as in Figure 3, where a pinion 20 is shown and described later. The chamber is filled with a suitable gas, say, a mixture of argon and carbon dioxide, and this is introduced into the chamber through a small pipe 15, a similar pipe 16 being provided through which the displaced air can pass. When the chamber has been properly filled with the gas the ends of both pipes are sealed by soldering. The pressure in the chamber is slightly above atmospheric pressure, just enough to cause a slight bulge on the diaphragm 5. It will be seen from Figure 1 that the parts described are supported in a casing 17 and a cover, not shown in Figure 1, is provided which is clamped to this casing by bolts passing through the holes 18, Figure 2, members associated with the cover being arranged to press resiliently on the top of the chamber to hold it firmly in position and in close electrical contact with the spring 14. The arrangement will be better understood from the description of Figure 3 which is given later.

Figure 4:
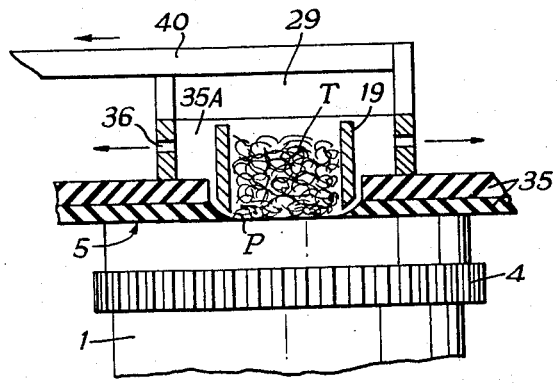
Figure 4 is a diagram showing the application of the invention to the measurement of a moving tobacco filler and shows the arrangement of the scanner with respect to the trough in which the filler moves.

The radiation gauge is arranged to measure the mass of a loose tobacco filler in a cigarette making machine as shown in Figure 4. With earlier constructions of gauges for this purpose certain inaccuracies occurred due to the accumulation of dust either on the ionization chamber or on the radio-active source and the removal of this required a good deal of apparatus and was not easy to do. To overcome the difficulties due to dust the trough along which the loose filler passes is arranged in the present instance to lie across the circular top of the chamber, i.e. the nickel diaphragm 5, as shown in Figure 4, and the paper runs across the diaphragm in contact therewith and sweeps away any dust by its movement. In order to do this, the chamber diaphragm is arranged slightly above the normal level of the bottom of the trough, but insulated from any metallic parts thereof by plates 35. As shown in Figure 4, the paper web P lies on top of the chamber 1 with the tobacco T on the paper and confined laterally by guides 19. Further description of Figure 4 is deferred for the moment.

Figure 3:
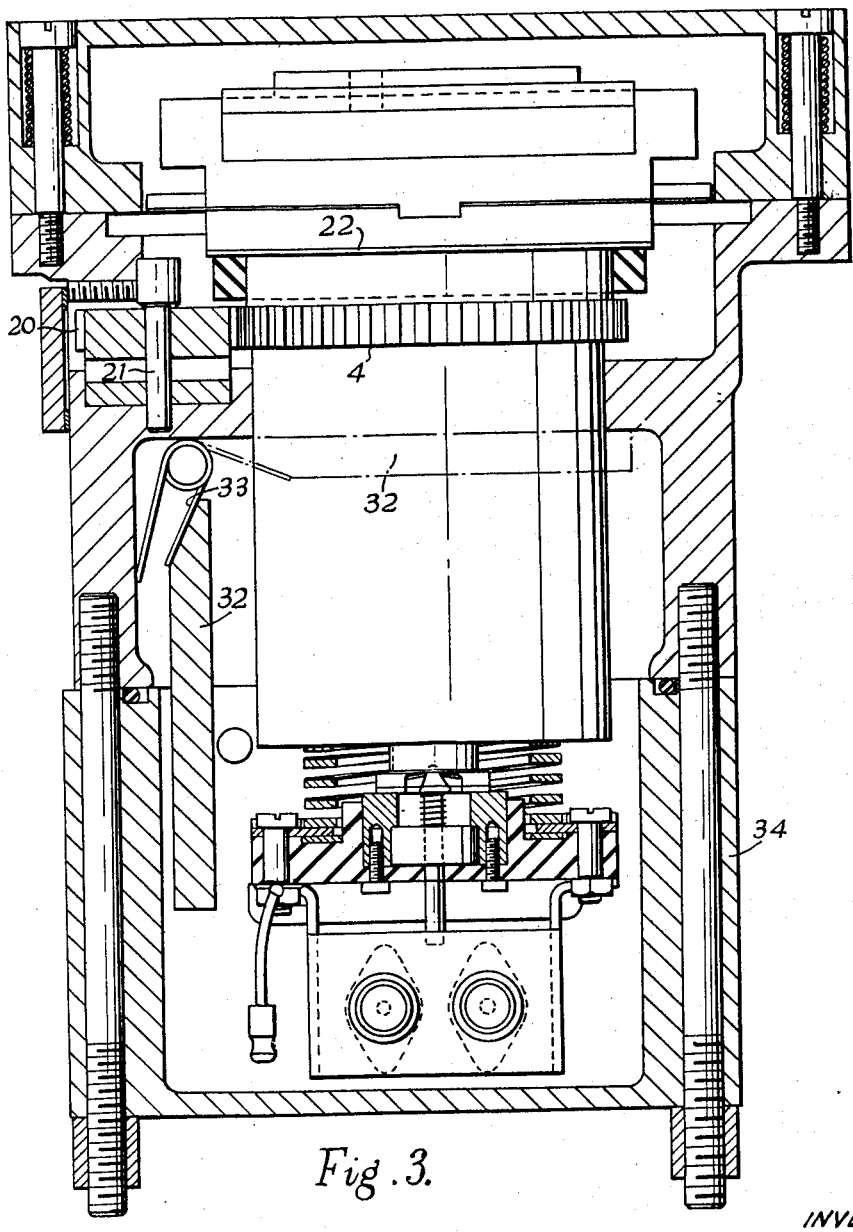
Figure 3 is a transverse section of the lower part of Figure 1 and the view is continued to show the full extent of one example of housing for the ionization chamber, said housing being shown as suitable for the chamber of a balancing unit.
Figure 5:
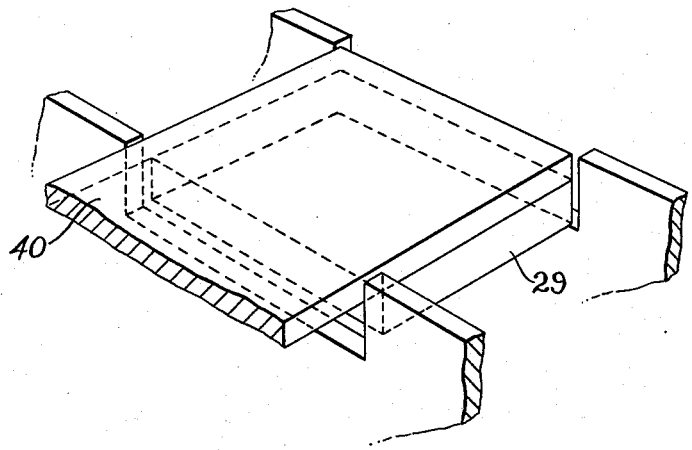
Figure 5 is a perspective view of the upper part of Figure 4.
Figure 6:
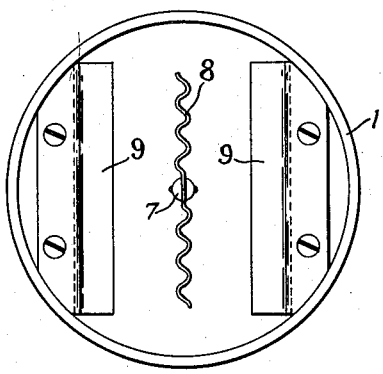
Figure 6 is a plan view of the chamber shown in Figure 1 with the top removed.

Referring now to Figure 3, this view, as previously stated, shows a particular kind of housing for the chamber but it will be readily understood that the top of the housing can be of any shape to suit the use of the chamber. The mounting of the chamber is the same as in Figure 1 and needs no further description but the gear 4 is shown engaging teeth on a pinion 20 which can be rotated on a pin 21 by a tommy bar so as to rotate the chamber round its longitudinal axis, the chamber being supported meanwhile by the spring 14 which presses the chamber top against an insulating ring 22 which is part of the devices shown at the top of Figure 3 and which form no part of the present invention.

If, for any reason, it becomes necessary to remove the ionization chamber it is necessary to shield the source and for this purpose there is provided a hinged flap 32 which is under the influence of springs 33, and springs up to the chain-line position, Figure 3, to cover the aperture which would be left if the chamber and the base of the device, which is marked 34 and equivalent to the base 17 of Figure 1, were removed. This flap may be made of a transparent plastic material.

Referring again to Figure 4, it will be seen that the top of the chamber is pressed against stationary parts 35 so that the chamber is held in much the same manner as the chamber of Figure 3. The guides 19 control the tobacco filler laterally and the filler T is carried on the paper P and the edges of the paper are turned up as shown to hinder escape of filler or dust. Any dust which does reach the top of the chamber is swept away by the moving web but if desired suction may be exerted in the spaces 35A through apertures 36, to ensure that there is no dust deposit on the chamber. The ray source 29 is held as shown as near to the top surfaces of the guides 19 as possible. The source is fixed to a bar 40 slidable in a guide (not shown). If it is desired to remove the ionization chamber of Figure 4, the source is first moved back on its slide and any rays emitted are shielded by the bed of the cigarette machine which is a massive iron casting and a key operated lock may be used to fix the source in this safe position.

As previously remarked the sensitivity of a chamber may be adjusted by rotating the chamber. When the plates 9 of a chamber lie parallel to the tobacco filler, the effective aperture of the chamber is at a maximum. When they are at right-angles to the filler the aperture is at the minimum. Thus rotation of the chamber affords a very delicate means of adjusting the sensitivity of the chamber and in this way manufacture is expedited, since the accuracy of operation can be ensured by rotation of the chambers.

What I claim as my invention and desire to secure by Letters Patent is:

1. An ionization chamber for a radiation gauge for measuring a moving tobacco filler including a radioactive source, said chamber having a window and containing platelike electrodes so disposed that they lie in planes transverse to the plane of the window, and means for rotating the chamber whereby the electrode plates may be disposed in different angular relationships to the radio-active source of the gauge, thus presenting in combination with the tobacco filler passing between the source and the chamber differing areas of chamber to the rays emitted from the source.

2. An ionization chamber as claimed in claim 1 wherein the chamber is of cylindrical shape and the window is at an end of the cylinder.

3. An ionization chamber as claimed in claim 1 wherein the planes of the electrodes are substantially normal to the plane of the window and cross-sections of the electrodes parallel to the plane of the window and in the same plane are parallel to one another.

4. An ionization chamber as claimed in claim 2 wherein the planes of the electrodes are substantially normal to the plane of the window and cross-sections of the electrodes parallel to the plane of the window and in the same plane are parallel to one another.

5. An ionization chamber as claimed in claim 1 adapted for the measurement of a tobacco filler carried on a moving web, and comprising means supporting said chamber adjacent said web with the window of the chamber in contact with said web.

References Cited in the file of this patent

UNITED STATES PATENTS

| | | |
|---|---|---|
| 2,397,073 | Hare | Mar. 19, 1946 |
| 2,465,821 | Smoluchowski | Mar. 29, 1949 |
| 2,586,303 | Clarke | Feb. 14, 1952 |
| 2,675,482 | Burnton | Apr. 13, 1954 |
| 2,715,195 | Friedman | Aug. 9, 1955 |
| 2,800,131 | Malins | July 23, 1957 |
| 2,812,464 | Pepinsky | Nov. 5, 1957 |